(12) United States Patent
Svendsen et al.

(10) Patent No.: US 9,545,597 B2
(45) Date of Patent: Jan. 17, 2017

(54) CONTINUOUSLY STIRRED TANK REACTOR ABSORBER AND FLASH TANK STRIPPER SYSTEM

(75) Inventors: John Arild Svendsen, Porsgrunn (NO); Steinar Pedersen, Skien (NO); Berit F. Fostås, Porsgrunn (NO)

(73) Assignee: STATOIL PETROLEUM AS, Stavanger (NO)

( * ) Notice: Subject to any disclaimer, the term of this patent is extended or adjusted under 35 U.S.C. 154(b) by 241 days.

(21) Appl. No.: 14/361,821

(22) PCT Filed: Dec. 1, 2011

(86) PCT No.: PCT/EP2011/071535
§ 371 (c)(1),
(2), (4) Date: Jul. 11, 2014

(87) PCT Pub. No.: WO2013/079116
PCT Pub. Date: Jun. 6, 2013

(65) Prior Publication Data
US 2014/0352532 A1  Dec. 4, 2014

(51) Int. Cl.
*B01D 53/14* (2006.01)
*B01D 53/18* (2006.01)
(Continued)

(52) U.S. Cl.
CPC ....... *B01D 53/1493* (2013.01); *B01D 53/1406* (2013.01); *B01D 53/1412* (2013.01);
(Continued)

(58) Field of Classification Search
CPC ............... B01D 2252/204; B01D 2252/20405; B01D 2252/20421; B01D 2252/20426; B01D 2252/20431; B01D 2252/20484; B01D 2252/20489; B01D 53/1406; B01D 53/1412; B01D 53/1425; B01D 53/1462; B01D 53/1468; B01D 53/1475
See application file for complete search history.

(56) References Cited

U.S. PATENT DOCUMENTS 4,997,630 A * 3/1991 Wagner .............. B01D 53/1406
                                                        423/226
6,102,987 A    8/2000 Gross et al.
(Continued)

FOREIGN PATENT DOCUMENTS

DE   10 2008 061 258    6/2010
EP    0 920 901         5/2002
(Continued)

OTHER PUBLICATIONS

International Search Report issued Aug. 1, 2012 in International Application No. PCT/EP2011/071535.
(Continued)

*Primary Examiner* — Duane Smith
*Assistant Examiner* — Cabrena Holecek
(74) *Attorney, Agent, or Firm* — Wenderoth, Lind & Ponack, L.L.P.

(57) ABSTRACT

The invention relates to a process for separation or purification of gaseous streams by removal of acid gases using a liquid amine solution. The process involves the steps of —contacting the gaseous stream with liquid lean amine solution in at least one continuous flow stirred-tank reactor (10; 10*a*, 10*b*; 10*c*); —removing a sweetened gaseous flow from said continuous flow stirred-tank reactor (10); —removing rich amine from said continuous flow stirred-tank reactor (10; 10*a*, 10*b*; 10*c*) for regeneration; —passing rich amine solution through at least one flash tank stripper 20; 20*a*, 20*b*; 20*c*; —removing acid gases and vapor from said flash tank stripper 20; 20*a*, 20*b*; 20*c*; —removing lean amine
(Continued)

from said flash tank stripper for recirculation to said continuous flow stirred-tank reactor (10; 10a, 10b; 10c).

13 Claims, 4 Drawing Sheets

(51) Int. Cl.
    *C10L 3/10* (2006.01)
    *C10K 1/00* (2006.01)
    *C10K 1/14* (2006.01)

(52) U.S. Cl.
    CPC ..... *B01D 53/1425* (2013.01); *B01D 53/1462* (2013.01); *B01D 53/1468* (2013.01); *B01D 53/1475* (2013.01); *B01D 53/18* (2013.01); *C10K 1/004* (2013.01); *C10K 1/005* (2013.01); *C10K 1/143* (2013.01); *C10L 3/103* (2013.01); *C10L 3/104* (2013.01); *B01D 2252/204* (2013.01); *B01D 2252/20405* (2013.01); *B01D 2252/20421* (2013.01); *B01D 2252/20426* (2013.01); *B01D 2252/20431* (2013.01); *B01D 2252/20484* (2013.01); *B01D 2252/20489* (2013.01); *B01D 2258/0283* (2013.01); *C10L 2290/12* (2013.01); *C10L 2290/48* (2013.01); *C10L 2290/541* (2013.01); *C10L 2290/545* (2013.01); *Y02C 10/06* (2013.01); *Y02P 20/152* (2015.11)

(56) References Cited

U.S. PATENT DOCUMENTS

| | | | |
|---|---|---|---|
| 2009/0099269 A1* | 4/2009 | Rigby | B01D 53/1412 518/705 |
| 2010/0011956 A1 | 1/2010 | Neumann et al. | |
| 2010/0011958 A1* | 1/2010 | Cadours | B01D 53/1425 95/187 |
| 2010/0116129 A1* | 5/2010 | Molaison | B01D 53/1462 95/44 |
| 2010/0319539 A1 | 12/2010 | Neumann et al. | |
| 2010/0320294 A1 | 12/2010 | Neumann et al. | |

FOREIGN PATENT DOCUMENTS

| | | |
|---|---|---|
| WO | 03/013699 | 2/2003 |
| WO | 2010/037040 | 4/2010 |

OTHER PUBLICATIONS

Written Opinion of the International Searching Authority issued Aug. 1, 2012 in International Application No. PCT/EP2012/071535.
Portugal A.F., et al., "Carbon dioxide absorption kinetics in potassium threonate", Chemical Engineering Science, Oxford, GB, vol. 63, No. 13, Jul. 1, 2008, pp. 3493-3503, XP022710489.

* cited by examiner

CONTINUOUSLY STIRRED TANK REACTOR ABSORBER AND FLASH TANK STRIPPER SYSTEM

TECHNICAL FIELD

The present invention relates to the field of fluid separation. More specifically, the present invention relates to the separation of acid gases from a gaseous hydrocarbon fluid stream or from a flue gas stream.

BACKGROUND ART

The production of hydrocarbons from a reservoir often causes production of non-hydrocarbon gases. Such gases include contaminants such as hydrogen sulphide ($H_2S$) and carbon dioxide ($CO_2$). When $H_2S$ and $CO_2$ are produced as part of a hydrocarbon gas stream (such as methane or ethane), the raw gas stream is sometimes referred to as "sour gas." The $H_2S$ and $CO_2$ are often referred to together as "acid gases."

Acid gases may also be associated with synthesis or refinery gas streams. Acid gases may also be generated by the combustion of carbon based materials such as coal, natural gas or other carbon based fuels. In any instance, raw gas streams may contain other "acidic" impurities. These include mercaptans and other trace sulphur compounds. Such impurities should be removed prior to industrial or residential use.

While $H_2S$, mercaptans and trace sulphur compounds have long been captured through separation processes, $CO_2$ has oftentimes simply been vented to the atmosphere. However, the practice of venting $CO_2$ is coming into conflict with national or regional emission requirements which can limit $CO_2$ emissions. Hence, processes for removing $CO_2$ are of greater interest to industries that operate gas processing facilities, particularly within the oil and gas production industry.

There are a number of processes for removing acid gas from a raw natural gas stream or flue gas streams. A common method involves treating the hydrocarbon fluid stream with a solvent. Solvents may include chemical solvents such as amines. Examples of amines used in sour gas treatment include monoethanol amine (MEA), diethanol amine (DEA), and methyl diethanol amine (MDEA). Amine-based solvents rely on a chemical reaction with the acid gases. The reaction process is sometimes referred to as "gas sweetening." As a result of the gas sweetening process, a treated or "sweet" gas stream is created. The sweet gas stream has been substantially depleted of $H_2S$ and/or $CO_2$ components. The sweet gas can be further processed for liquids recovery, that is, by condensing out heavier hydrocarbon gases. The extracted $CO_2$ may be sold or otherwise used for enhanced oil recovery operations.

Traditionally, the removal of acid gases using chemical solvents involves counter-currently contacting the natural gas/flue gas stream with the solvent. The raw gas stream is introduced into the bottom section of a contacting tower column absorber, which is also referred to as a contacting tower, a column absorber, or simply a tower. In the subsequent text the term "column absorber" will be used. At the same time, the solvent solution is directed into a top section of the column absorber. The column absorber has trays, packings or other internal components. As the liquid solvent cascades through the column absorber it absorbs the undesirable acid gas components and carries them away through the bottom of the contacting column absorber as part of a "rich" solvent solution. At the same time, gaseous fluid that is largely depleted of $H_2S$ and/or $CO_2$ exits at the top of the column absorber.

It is common to use a variety of absorbent liquids to absorb acid gases such as $H_2S$ and/or $CO_2$ from gas or hydrocarbon liquid streams. Upon absorption, the absorbent liquid is said to be "rich." Following absorption, a process of regeneration (also called "desorption") may be employed to separate acid gases from the active solvent of the absorbent liquid. This produces a "lean" solvent that is then typically recycled for further absorption.

Known counter-current contactor towers used for $H_2S$ and $CO_2$ scrubbing tend to be very large and heavy. This creates particular difficulty in offshore oil and gas production applications, where both space and weight is an issue. Similar problems are created in power generation plants requiring removal of $CO_2$ from large quantities of generated flue gas. Accordingly, a need exists for an improved gas processing facility useful for the removal of acid gases from hydrocarbon gas streams in connection with oil and gas recovery that employs primarily smaller contacting devices.

The object of the invention is therefore to provide an improved solution that solves the above problems relating to the separation of acid gases from a gaseous hydrocarbon fluid stream or from a flue gas stream. These objects and others will become apparent from the following description.

DISCLOSURE OF INVENTION

The above problems are solved by a process according to the appended claims.

In the subsequent text, the term "acid gas" is defined as a gas including $CO_2$ and/or $H_2S$. Similarly, the term "sweet gas" is defined as a gas with a reduced $CO_2$ and/or $H_2S$ content. In the text below, the acid gas referred to is mainly $CO_2$, but the process is not limited to this used. It may, for instance, be used for capturing $CO_2$ and $H_2S$ simultaneously. The term "liquid amine" is defined as a mixture or solution of a suitable amine at a predetermined concentration and a diluent, such as water. Such compositions are well known to the skilled person and will not be described in further detail.

The present invention relates to a process for separation or purification of gaseous streams by removal of acid gases using a liquid amine solution to absorb said acid gas. The process involves the steps of contacting the gaseous stream with liquid lean amine solution in at least one continuous flow stirred-tank reactor;

removing a sweetened gaseous flow from said continuous flow stirred-tank reactor;

removing rich amine from said continuous flow stirred-tank reactor for regeneration;

passing rich amine solution through at least one flash tank stripper;

removing acid gases and vapour from said flash tank stripper;

removing lean amine from said flash tank stripper for recirculation to said continuous flow stirred-tank reactor;

The term "continuous flow stirred-tank reactor" (CFSTR) or CFSTR absorber is sometimes referred to as a "continuous stirred-tank reactor" (CSTR) or CSTR absorber. For the purpose of the invention, the term "CFSTR" will be used throughout, to indicate that the process is continuous.

The gaseous stream can also be contacted with liquid lean amine solution in multiple continuous flow stirred-tank reactors arranged in series. This arrangement can be used for handling a flow of gas with relatively high concentrations of acid gas, such as $CO_2$. The number of CFSTRs is dependent on the concentration of the liquid amine solution and the desired $CO_2$ content of the sweetened gaseous stream leaving the CFSTR. The effect of this arrangement can be improved by gradually increasing the lean amine concentration from the last to the first reactor in the series of reactors. In this way the partially cleaned gaseous stream reaching the last CFSTR will encounter regenerated lean amine directly from the stripping process. Similarly, the gaseous stream entering the first CFSTR will encounter the partially rich amine that has passed through some or all previous CFSTRs.

Alternatively, the gaseous stream can be contacted with liquid lean amine solution in multiple continuous flow stirred-tank reactors arranged in parallel. This arrangement can be used for handling a relatively large flow of gas, wherein the total gas flow is split into multiple streams each supplied to a continuous flow stirred-tank reactor. If more than a single step is required to absorb relatively high concentrations of acid gas, then a series configuration can be used. A mixture of continuous flow stirred-tank reactors in parallel and series is also in principle possible.

In the examples given above, the gaseous stream is contacted with liquid lean amine solution by supplying the gaseous stream directly into the liquid solvent at the bottom of the CFSTR and removing said gaseous stream at the top of the CFSTR. This reduces the transfer area between liquid and gas in contrast to an ordinary packed bed column absorber.

According to a further alternative, the efficiency of the process can be enhanced further by contacting the gaseous stream with liquid lean amine solution in a plug flow reactor downstream of said continuous flow stirred-tank reactor. The main characteristic of a plug flow reactor or PFR is that no mixing occurs in the direction of flow. Instead, complete mixing is assumed within a cross-sectional area of the plug flow reactor. Lean amine and dissolved $CO_2$ will move along the PFR, wherein remaining dissolved $CO_2$ in the outlet liquid flow reacts with the solvent. PFRs are well known in the art and will only be described briefly here. In its simplest form, the PFR can be arranged as a pipe with a predetermined cross-section leaving the CSTR, which pipe can have any suitable shape along its length, such as straight, spiral, etc. If the amine flow leaving the CFSTR contains dissolved $CO_2$, then the subsequent pump must be able to handle two-phase flow.

According to a final alternative, the efficiency of the process can be enhanced by contacting the gaseous stream with liquid lean amine solution in a conventional column absorber located upstream of said continuous flow stirred-tank reactor. Lean amine would then be supplied first to the column absorber and then be passed through said at least one CFSTR.

When the absorption step has been completed the rich acid gas containing liquid amine is removed for regeneration. Rich amine is removed by means of a pump and is passed via a heat exchanger, or economizer, in which the relatively cool rich amine is used for cooling relatively hot lean amine leaving the stripping process. An optional heater can be provided for bringing the rich amine solution to a predetermined temperature, which forms a suitable input value for the stripping process.

During the regeneration process, rich amine solution is passed through at least one flash tank stripper. The rich amine stream undergoes a reduction in pressure by passing through a throttling valve also termed flash valve. Flash or partial evaporation is the partial vaporization that occurs during a sudden pressure drop. The flash valve is used to control pressure and temperature at the inlet to the flash tank in order to maintain optimum flash conditions. The flash valve is located at the entry into a pressure vessel making up the flash tank so that the flash evaporation occurs within the vessel.

A part of the liquid amine immediately "flashes" into vapor to release $CO_2$. Both the vapour and the residual liquid are cooled to the saturation temperature of the liquid at the reduced pressure. The remaining liquid amine is heated in the lower part of the flash tank to release additional $CO_2$. Due to the inherent properties of amines the residence time in the flash tank should be kept relatively short to avoid degradation. If it is desired to remove more $CO_2$, then multiple flash tank strippers can be arranged in series.

Alternatively, multiple flash tank strippers can be arranged in parallel. This arrangement can be used for handling a relatively large flow of rich amine, wherein the total flow is split into multiple streams each supplied to a flash tank stripper. If more than a single step is required to strip relatively high concentrations of acid gas from the rich amine, then a series configuration can be used.

According to a further alternative, the efficiency of the process can be enhanced by contacting the rich amine solution with steam in a conventional column stripper located downstream of the at least one flash tank stripper.

Acid gases and vapour containing amine and water is passed from said flash tank stripper through a condenser. In the condenser, pure $CO_2$ is removed for further processing or storage. A solution comprising lean amine and condensate diluent water is removed for recirculation. This lean amine solution is pumped back to said heat exchanger, where it is cooled by the rich amine solution before being supplied to the CFSTR or the PFR.

Figure 1:
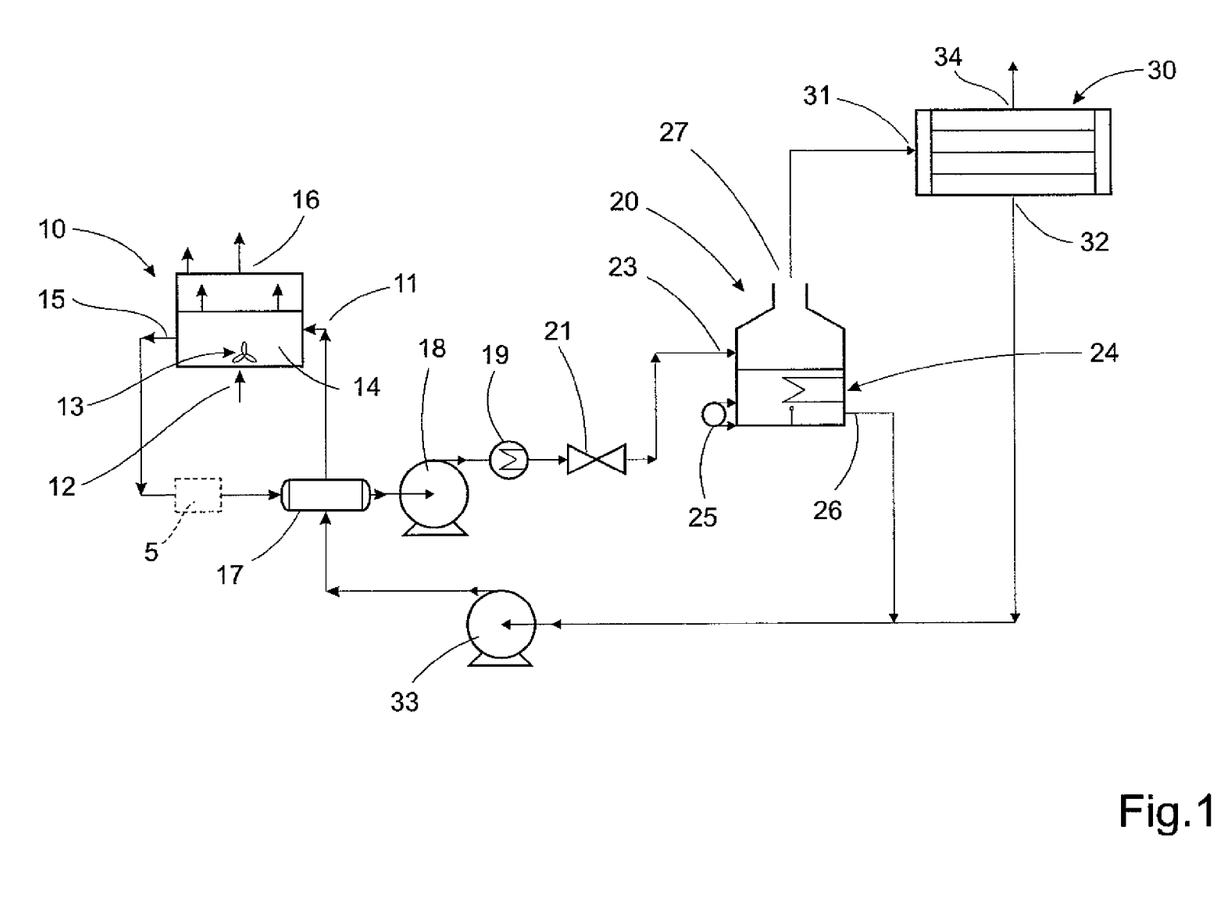
FIG. 1 shows a schematic combined CFSTR absorber and flash tank stripper system according to the invention.

The invention outlined above describes a combined continuous flow stirred tank reactor (CFSTR) absorber and flash tank stripper system for $CO_2$ capture. These will be described in further detail in the schematic Figures below. According to the invention the conventional counter-current column absorber used in many $CO_2$ capture plants is replaced by one CFSTR absorber or multiple CFSTR absorbers in series. Only one mixed tank absorber is shown in FIG. 1. It is also an option to replace one CFSTR absorber with a number of smaller CFSTR absorbers in parallel in order to improve the mixing properties if necessary. The parallel option is not visualized in the figures. The sequence of the serially arranged units involved in both absorption and desorption/stripping, as shown in e.g. FIG. 2, may be interchanged.

The inventive idea is to reduce the height of both the column absorber and the column stripper considerably since the CFSTR absorber and the flash tank are considerably smaller. In addition, the size and capacity of the re-boiler will be reduced accordingly. It is suggested that both the conventional absorber column and the stripper column with re-boiler are superfluous. Many solvents can be used in this $CO_2$ capture system, also the frequently used amine solvent MEA/$H_2O$, diethanol amine (DEA), and methyl diethanol amine (MDEA) or any other suitable solvent.

The process according to the invention is performed at a predetermined pressure dependent on the supply pressure of the gas stream. Hence, the invention is not restricted to low pressure processes, but can be performed at relatively high gas supply pressures, such as 60-70 bar.

BRIEF DESCRIPTION OF DRAWINGS

The invention will be described in detail with reference to the attached figures. It is to be understood that the drawings are designed solely for the purpose of illustration and are not intended as a definition of the limits of the invention, for which reference should be made to the appended claims. It should be further understood that the drawings are not necessarily drawn to scale and that, unless otherwise indicated, they are merely intended to schematically illustrate the structures and procedures described herein.

EMBODIMENTS OF THE INVENTION

FIG. 1 shows a schematic combined CFSTR absorber and flash tank stripper system according to the invention. Only the main operational units are shown. A continuous flow stirred-tank reactor or CFSTR 10 is supplied with lean amine solution through a first inlet conduit 11. The lean amine solution contacts a gaseous stream containing $CO_2$ supplied to the CFSTR 10 through a second inlet conduit 12 at the bottom of the CFSTR 10. The CFSTR 10 shown in this example is provided with a stirring device 13 to enhance mixing of lean amine and gas bubbles within the liquid volume 14. Such a stirring device can be used to assist the mixing in the tank. Rich amine with absorbed $CO_2$ leaves the CFSTR 10 through a first outlet 15 for regeneration in a stripping process. Optionally, the liquid outlet 15 can act as a plugged flow reactor or PFR 5 if the liquid in 15 contains remaining dissolved $CO_2$ gas. Part of liquid flow 15 may be recycled to liquid volume 14 if desired. This optional PFR 5 is schematically indicated with dashed lines in FIG. 1. In its simplest form, the PFR 5 comprises a pipe with a predetermined cross-section leaving the CSTR 10, which pipe can have any suitable shape along its length, such as straight or spiral. Remaining lean amine and any dissolved $CO_2$ from the CFSTR 10 will move along the PFR 5, wherein the remaining dissolved $CO_2$ in the outlet liquid flow will react with the solvent. A sweetened gaseous stream leaves the CFSTR 10 through a second outlet 16 for immediate use of for suitable further processing. In this example, the gaseous stream is natural gas with a predetermined CO2 content. The CFSTR 10 will be described in further detail in connection with FIG. 3.

Rich amine with absorbed $CO_2$ flows through a heat exchanger 17, in which the relatively cool rich amine is used for cooling relatively hot lean amine leaving the stripping process. A pump 18 is provided for pressurizing the rich amine which is subsequently heated to a predetermined temperature in a heater 19.

The rich amine solution is passed to a flash tank stripper 20. The rich amine stream undergoes a pressure reduction by passing through a flash valve 21 at an inlet conduit 23 at the entry into the flash tank 20. The flash valve 21 is used to control pressure and temperature at the inlet conduit 23 to the flash tank 20 in order to maintain optimum flash conditions within the flash tank 20.

A part of the liquid amine solution immediately "flashes" into vapor to release $CO_2$. Both the vapour and the residual liquid are cooled to the saturation temperature of the liquid at the reduced pressure. The remaining liquid amine solution is heated by steam flowing through steam pipes 24 in a lower part of the flash tank 20 to release additional $CO_2$. The lower part of the flash tank 20 is also provided with a liquid controller 25 for maintaining the liquid level in the lower part of the flash tank 20. Lean amine solution leaves the lower part of the flash tank 20 through a first outlet conduit 26 and is returned to the absorber process. The residence time in the flash tank 20 is relatively short to avoid degradation.

Flashed and released $CO_2$ will leave the flash tank 20 through a second outlet conduit 27 at the upper part of the flash tank 20. In addition to $CO_2$, an amount of vapour containing amine and water diluent will leave the upper part of the flash tank 20.

Acid gas and vapour containing amine and water is passed from said flash tank 20 to a first inlet conduit 31 of a condenser 30. A solution comprising lean amine and condensate diluent water is removed through a first outlet conduit 32 for recirculation. This lean amine solution is merged with the lean amine from the first outlet conduit 26 of the flash tank 20 and is pumped back via a pump 33 to said heat exchanger 17, where it is cooled by the rich amine solution from the absorber process before being supplied to the CFSTR 10. In the condenser 30, pure $CO_2$ is removed through a second outlet conduit 34 for further processing or storage.

Figure 3:
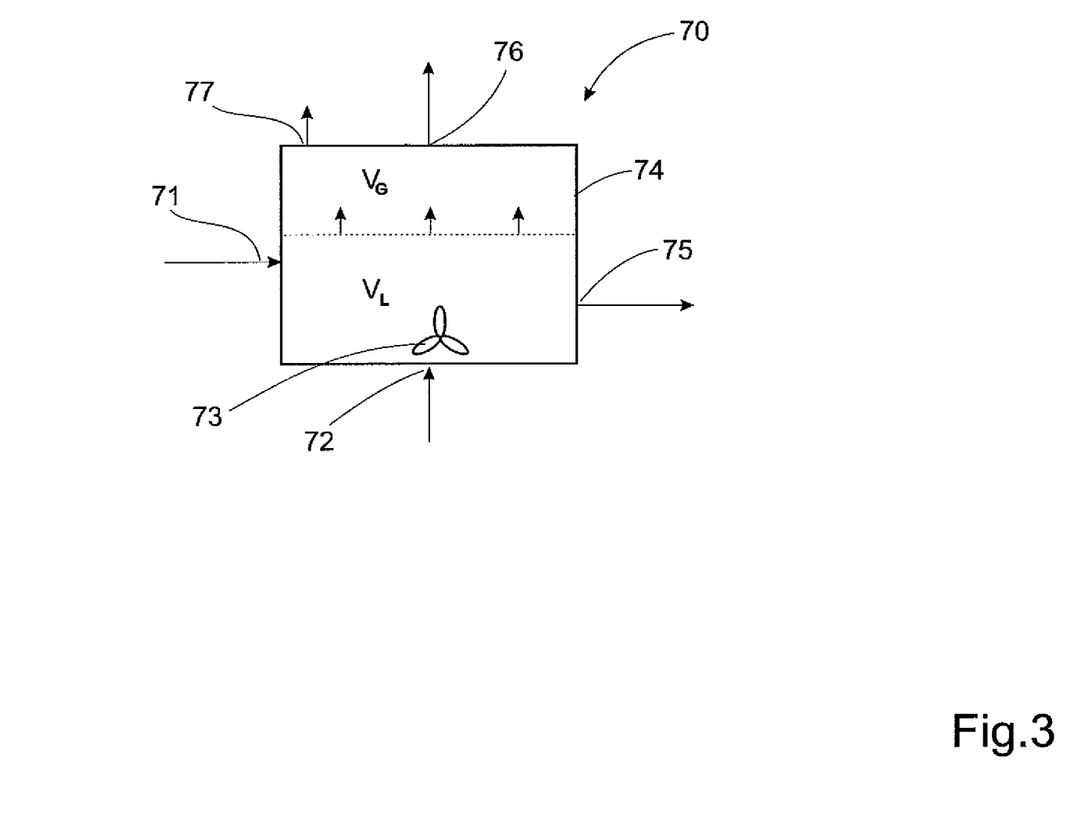
FIG. 3 shows a schematic illustration of a CFSTR as used in the invention.

Pressure controllers and other utility equipment installed for control of the process are not shown in FIG. 1. A more detailed description of the CFSTR absorber is shown in FIG. 3.

The process in FIG. 1 can be enhanced further by contacting the gaseous stream with the liquid lean amine solution in a plug flow reactor 5 (PFR; indicated in dashed lines) downstream of said continuous flow stirred-tank reactor 10. Lean amine and dissolved $CO_2$ will move with the same velocity along the PFR, wherein $CO_2$ is absorbed into the lean amine during the mixing. If a PFR is used, the subsequent pump must be able to handle two-phase flow.

Figure 2A:
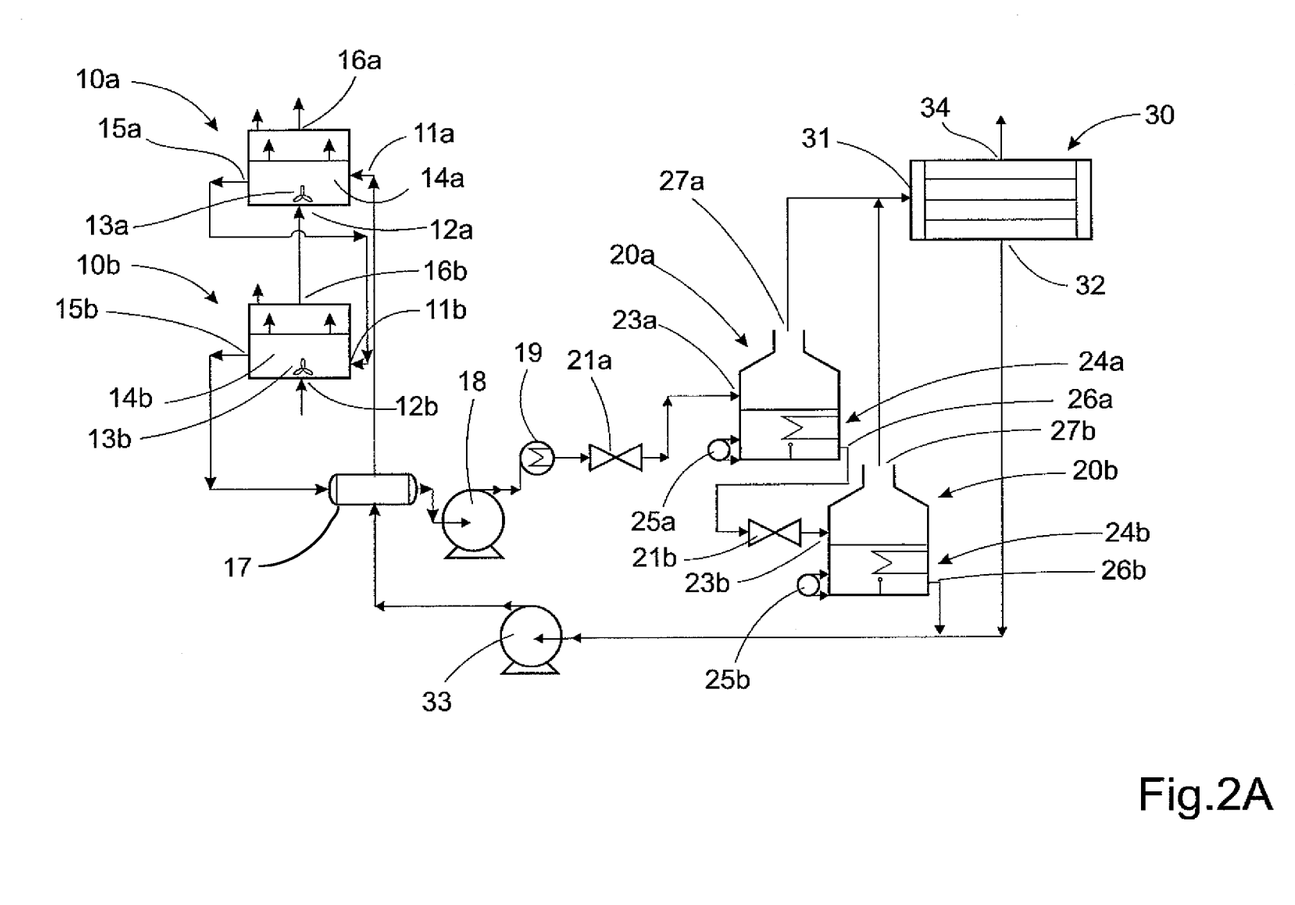
FIG. 2A shows a first alternative combined CFSTR absorber and flash tank stripper system according to the invention.

FIG. 2A shows a first alternative combined CFSTR absorber and flash tank stripper system according to the invention. The system in FIG. 2A differs from that of FIG. 1 in that the single CFSTR 10 has been replaced by a first and a second CFSTR 10a, 10b respectively. Similarly, the single flash tank 20 has been replaced by a first and a second flash tank 20a, 20b, respectively, in series. The remaining components are the same as in FIG. 1 and are provided with the same reference numbers.

Hence, in the system in FIG. 2A a first continuous flow stirred-tank reactor or CFSTR 10a is supplied with lean amine solution through a first inlet conduit 11a. The lean amine solution contacts a gaseous stream containing $CO_2$ supplied from a second CFSTR 10b to the first CFSTR 10a through a second inlet conduit 12a at the bottom of the first CFSTR 10a. In this example the first CFSTR 10a is provided with a first stirring device 13a to enhance mixing of lean amine solution and gas bubbles within the first liquid volume 14a. Such a stirring device is used to assist the mixing in the tank if deemed necessary. Partially enriched amine solution with absorbed $CO_2$ leaves the first CFSTR 10a through a first outlet conduit 15a and is supplied to the second CFSTR 10b. A sweetened gaseous stream leaves the first CFSTR 10a through a second outlet conduit 16a for further processing.

Partially enriched amine solution enters the second CFSTR 10b through a further amine solution inlet conduit 11b and contacts a gaseous stream containing $CO_2$ supplied to the second CFSTR 10b through a further gas inlet conduit 12b at the bottom of the second CFSTR 10b. The further gas inlet conduit 12b is connected to a source of gas, such as flue gas or natural gas. The second CFSTR 10b is provided with a further stirring device 13b, in the same way as the first CFSTR 10a, to enhance mixing of amine solution and gas bubbles within the further liquid volume 14b. Rich amine solution with absorbed $CO_2$ leaves the second CFSTR 10b through a further amine solution outlet conduit 15a for regeneration in a stripping process. A partially sweetened gaseous stream leaves second CFSTR 10b through a further gas outlet conduit 16b and is supplied to the first CFSTR 10a.

As in described in FIG. 1, the rich amine solution is subsequently passed from the absorbing process to the stripping process.

In this case, the rich amine solution is passed to a first and a second flash tank 20a, 20b. The rich amine stream undergoes a pressure reduction by passing through a first flash valve 21a at a first inlet conduit 23a at the entry into the first flash tank 20a. The first flash valve 21a is used to control pressure and temperature at the first inlet conduit 23a to the first flash tank 20a in order to maintain optimum flash conditions within the first flash tank 20a. A part of the liquid amine solution immediately "flashes" into vapor to release $CO_2$. The remaining liquid amine solution is heated by steam flowing through first steam pipes 24a in a lower part of the first flash tank 20a to release additional $CO_2$. The lower part of the first flash tank 20a is also provided with a first liquid controller 25a for maintaining the liquid level in the lower part of the flash tank 20a. Lean amine solution leaves the lower part of the first flash tank 20a through a first outlet conduit 26a and is supplied to the second flash tank 20b.

The above stripping process is then repeated in the second flash tank 20b. Hence, the partially stripped amine stream undergoes a further pressure reduction by passing through a second flash valve 21b at a further inlet 23b at the entry into the second flash tank 20b. The second flash valve 21b controls pressure and temperature at the further inlet 23b to the second flash tank 20b in order to maintain optimum flash conditions within the first flash tank 20b. A further part of the partially stripped liquid amine solution immediately "flashes" into vapor to release $CO_2$. The remaining liquid amine solution is heated by steam flowing through steam pipes 24b in a lower part of the second flash tank 20b to release additional $CO_2$. The lower part of the second flash tank 20b is also provided with a second liquid controller 25b for maintaining the liquid level in the lower part of the second flash tank 20b. Lean amine solution leaves the lower part of the second flash tank 20b through a further outlet conduit 26b and is supplied to the absorber process.

The residence time in the flash tanks 20a, 20b is relatively short to avoid degradation of the amine.

Flashed and released $CO_2$ will leave the first and second flash tanks 20a, 20b through outlet conduits 27a, 27b at the upper part of the respective flash tank 20a, 20b. In addition to $CO_2$, an amount of vapour containing amine and water diluent will leave the upper parts of said flash tanks 20a, 20b.

Acid gas and vapour containing amine and water is passed from said flash tanks 20a, 20b to a first inlet conduit 31 of a condenser 30. A solution comprising lean amine and condensate diluent water is removed through a first outlet conduit 32 for recirculation. This lean amine solution is merged with the lean amine from the outlet conduit 26b of the second flash tank 20b and is pumped back via a pump 33 to said heat exchanger 17, where it is cooled by the rich amine solution from the absorber process before being supplied to the CFSTR 10. In the condenser 30, pure $CO_2$ is removed through a second outlet conduit 34 for further processing or storage.

Figure 2B:
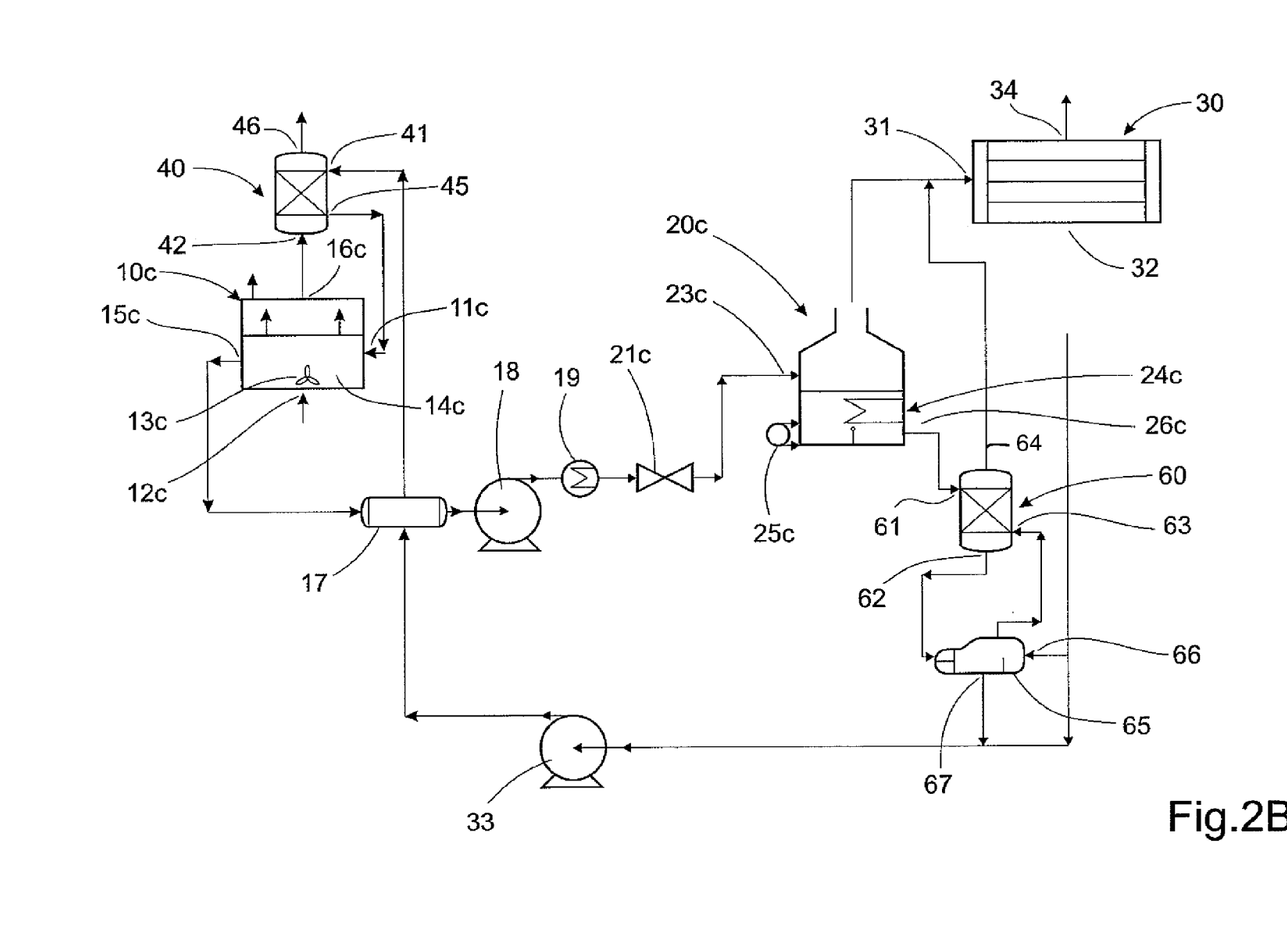
FIG. 2B shows a second alternative combined CFSTR absorber and flash tank stripper system according to the invention.

FIG. 2B shows a second alternative combined CFSTR absorber and flash tank stripper system according to the invention. The system in FIG. 2B differs from that of FIG. 2A in that the initial CFSTR 10 has been replaced by a column absorber 40. Similarly, the second flash tank 20b has been replaced by a column stripper 60. The remaining components are the same as in FIG. 1 and are provided with the same reference numbers.

Hence, in the system in FIG. 2B an initial column absorber 40 is supplied with lean amine solution through a first inlet conduit 41. The lean amine solution contacts a gaseous stream containing $CO_2$ supplied from a CFSTR 10c through a second inlet conduit 42 at the bottom of the column absorber 40. The column absorber 40 is a conventional absorber which will not be described in detail here. Partially enriched amine solution with absorbed $CO_2$ leaves the column absorber 40 through a first outlet conduit 45 and is supplied to the CFSTR 10c. A sweetened gaseous stream leaves the column absorber 40 through a second outlet conduit 46 for further processing.

Partially enriched amine solution enters the CFSTR 10c through a first inlet conduit 11c and contacts a gaseous stream containing $CO_2$ supplied to the CFSTR 10c through a second inlet conduit 12c at the bottom of the CFSTR 10c. The second gas inlet conduit 12c is connected to a source of natural gas. The CFSTR 10c is provided with a stirring device 13c to enhance mixing of amine solution and gas bubbles within the liquid volume 14c in the tank. Rich amine solution with absorbed $CO_2$ leaves the CFSTR 10c through a first outlet conduit 15c for regeneration in a stripping process. As described in connection with FIG. 1, an optional plugged flow reactor (nor shown) can be provided at this stage. A partially sweetened gaseous stream leaves the CFSTR 10c through a second outlet conduit 16. As in described in FIG. 2A, the rich amine solution is subsequently passed from the absorbing process to the stripping process.

In the stripping process, the rich amine solution is passed to a flash tank 20c. The rich amine stream undergoes a pressure reduction by passing through a first flash valve 21c at a first inlet conduit 23c at the entry into the flash tank 20c. The first flash valve 21c is used to control pressure and temperature at the first inlet conduit 23c to the flash tank 20c in order to maintain optimum flash conditions within the flash tank 20c. A part of the liquid amine solution immediately "flashes" into vapor to release $CO_2$. The remaining liquid amine solution is heated by steam flowing through steam pipes 24c in a lower part of the flash tank 20c to release additional $CO_2$. The lower part of the flash tank 20c is also provided with a liquid controller 25c for maintaining the liquid level in the lower part of the flash tank 20c. Partially stripped amine solution leaves the lower part of the first flash tank 20a through a first outlet conduit 26c and is supplied to a subsequent column stripper 60.

Partially stripped amine solution is supplied to a first inlet conduit 61 at the top of the column stripper 60 and leaves as lean amine solution from a first outlet conduit 62 at the bottom of the column stripper 60. Heat for the stripping process is supplied through a second inlet conduit 63 from a reboiler 65 connected at the bottom of the column stripper 60. Acid gas and vapour containing amine and water is passed from a second outlet conduit 64 at the top of the column stripper 60 to a first inlet conduit 31 of a condenser

30. The counter-current columns 40, 60 for absorption and stripping shown in FIG. 2B are well known and are therefore not described further here.

A solution comprising lean amine and condensate diluent water is removed through a first outlet conduit 32 of the condenser 30 for recirculation. A fraction of the output from the condenser 30 is returned to the reboiler 65 through a second inlet conduit 66. The remaining lean amine solution from the condenser 30 is merged with the lean amine from a second outlet conduit 67 from the reboiler 65 and is pumped back via a pump 33 to said heat exchanger 17, where it is cooled by the rich amine solution from the absorber process before being supplied to the CFSTR 10. In the condenser 30, pure $CO_2$ is removed through a second outlet conduit 34 for further processing or storage.

FIG. 3 shows a schematic illustration of a CFSTR 70 as used in the invention. The CFSTR 70 comprises a tank 75 having a gas volume $V_g$ and a liquid volume $V_l$ as shown in FIG. 3. The CFSTR 70 is supplied with lean amine solution through a first inlet conduit 71. The lean amine solution contacts a gaseous stream supplied to the CFSTR 70 through a second inlet conduit 72 and is injected directly into the liquid at the bottom of the CFSTR 70. The CFSTR 70 is provided with a stirring device 73 to enhance mixing of lean amine and gas bubbles within the liquid volume $V_g$. Such a stirring device 73 is used to assist the mixing in the tank if deemed necessary. Rich amine with absorbed $CO_2$ leaves the CFSTR 70 through a first outlet 75 for regeneration in a stripping process. An optional PFR can be used at this stage, as described above. A sweetened gaseous stream leaves the CFSTR 70 through a second outlet 76 for further processing. A mixture of $CO_2$ (gas), $N_2$ (gas), $O_2$ (gas) and $H_2O$ (gas) flows into the liquid volume $V_l$ where the gas is mixed with a solvent. In the example presented here the solvent is mono ethanol amine (MEA) and $H_2O$ and the main reaction products are $MEAH^+$ ($MEA+H_2O=MEAH^+ +OH^-$) and carbamate. Initially the liquid volume contains a mixture of MEA and $H_2O$, $MEAH^+$ and carbamate with an initial $CO_2$ loading $\alpha_0$.

The gas volume $V_g$ in the tank is initially filled with $N_2$, $O_2$ and $H_2O$ vapour and possibly some $CO_2$. The $CO_2$ loading $\alpha$ increases due to the chemical reaction of dissolved $CO_2$ (gas) with MEA (liquid) in the liquid volume $V_l$. Mixing of gas and liquid in volume $V_l$ can be achieved in alternative ways. After some time the $CO_2$ loading will reach a steady-state level $\alpha_r$. The steady-state loading is frequently called the rich loading $\alpha_r$.

The gas components $N_2$ and $O_2$ are assumed inert (does not take part in the chemical reactions). The solubility of $N_2$ and $O_2$ in a MEA and $H_2O$ liquid mixture is low compared to $CO_2$. Hence, $N_2$ and $O_2$ are transferred from the liquid volume $V_l$ to the gas volume $V_g$ by mass transfer across the gas/liquid interface. A variable rate of $CO_2$ (gas) will be transferred from the liquid volume to the gas volume depending on the rate of the chemical reaction. Gas transfer of a component from liquid to gas occurs as long as the partial pressure of the component in volume $V_g$ is less than the equilibrium pressure, which can be calculated.

The chemical reaction of $CO_2$ with MEA in the liquid is exothermic and temperature dependent with known kinetics. No chemical reactions are assumed in the gas volume $V_g$ of the tank.

Small amounts of $CO_2$ gas will accumulate in the gas volume $V_g$ if the inlet flow rate of $CO_2$ is comparable with the rate of $CO_2$ consumed in the chemical reaction in the given liquid volume $V_l$.

Flue gas with $CO_2$ is supplied to a mixture of liquid $MEA/H_2O$ in order to increase the $CO_2$ loading $\alpha$ in the tank and in the tank outlet due to the chemical reaction of $CO_2$ with MEA. Most of the $CO_2$ reacts rapidly with MEA in the liquid mixing tank. Mass and heat transfer of gas components from the liquid volume to the gas volume occur across the gas/liquid interface.

A dynamic mass and energy balance for both liquid and gas in the CFSTR have been modelled. The model is programmed in Fortran 77 with name SORBER_CSTR. The chemical reaction with MEA and $CO_2$ in the liquid is modelled in addition to the mass transfer between liquid and gas in the gas/liquid interface. The outlet $CO_2$-loading $\alpha$, the gas temperature $T_g$ and the liquid temperature $T_l$ are calculated as function of time knowing the gas volume $V_g$ and the liquid volume $V_l$. In addition, the initial gas and liquid temperature must be known together with the initial gas and liquid composition in the tank. The inlet gas temperature and the inlet liquid temperature must be specified, together with the inlet composition and the inlet flow rate of both gas and liquid. The program easily calculates the liquid residence time $\tau_l$ for a specified input. From that information the time to steady-state appearance can be calculated. SORBER_CSTR is therefore a useful tool with respect to experiment planning and for understanding the CFSTR absorber behaviour in general, for both small and large scale absorbers.

A flash tank stripper used in the process according to the invention is shown in FIG. 1. $CO_2$, $H_2O$ and MEA are separated in the condenser and $H_2O$ and MEA from the condenser are mixed with the liquid lean amine outlet stream from the flash tank. The mixed stream is returned to the CFSTR absorber after heat exchange in the heat exchanger, as shown in FIG. 1. The optimal temperature T and pressure P conditions are tuned experimentally based on simulated start values. The flash valve in front of the flash tank is used to keep the fluid pressure and temperature at the inlet to the flash tank at optimum flash conditions. The liquid pressure at the flash valve inlet shall be sufficiently high in order to set the correct flash pressure in the flash valve. Pumping of liquids to moderately high pressures is inexpensive compared to gas compression. Between the pump and the flash valve a fluid heater may optionally be installed. An extra heat supply in the flash tank should also be considered in order to keep the best flash temperature. Pressure and temperature controlling means are not shown in the figures.

The invention is not limited to the above embodiments, but may be varied freely within the scope of the appended claims. Consequently, the figures described above only show a limited, basic number of possible combinations of CFSTRs and flash tank strippers arranged in series. The CFSTRs and flash tank strippers can also be arranged in parallel or in both series and parallel. In addition, multiple CFSTRs and flash tank strippers arranged in series can be combined in series with additional column absorbers and/or column strippers.

Also, the invention is not restricted for use in low pressure processes. In for example liquid natural gas (LNG) plants $CO_2$ must be removed before natural gas processing can begin in order to avoid clogging. The inlet pressure is typically 60-70 bars in LNG plants and gas at this pressure would be supplied to a CFSTR in the process. The invention can also be used to capture multiple gases, for example to capture $CO_2$ and $H_2S$ simultaneously.

The invention claimed is:
1. A process for separation or purification of gaseous streams by removal of acid gases using a liquid amine solution, the process comprising the steps of:

contacting the gaseous stream with liquid lean amine solution in at least one continuous flow stirred-tank reactor;

removing a sweetened gaseous flow from said continuous flow stirred-tank reactor;

removing rich amine solution from said continuous flow stirred-tank reactor for regeneration;

passing rich amine solution through at least one flash tank stripper;

removing acid gases and vapor from said flash tank stripper; and removing lean amine solution from said flash tank stripper for recirculation to said continuous flow stirred-tank reactor;

wherein the gaseous stream is contacted with liquid lean amine solution in a plug flow reactor downstream of said continuous flow stirred-tank reactor.

2. The process according to claim 1, wherein the gaseous stream is contacted with liquid lean amine solution in multiple continuous flow stirred-tank reactors arranged in series.

3. The process according to claim 1, wherein the gaseous stream is contacted with liquid lean amine solution in at least one continuous flow stirred-tank reactor and a column absorber arranged in series.

4. The process according to claim 1, wherein the gaseous stream is contacted with liquid lean amine solution in multiple continuous flow stirred-tank reactors arranged in parallel.

5. The process according to claim 1, wherein the gaseous stream is contacted with liquid lean amine solution by supplying the gaseous stream at the bottom of the continuous flow stirred-tank reactor and removing said gaseous stream at the top of said reactor.

6. The process according to claim 1, wherein rich amine solution is passed through two or more flash tank strippers arranged in series.

7. The process according to claim 1, wherein rich amine solution is passed through two or more flash tank strippers arranged in parallel.

8. The process according to claim 1, wherein rich amine solution is passed through at least one flash tank stripper and a column stripper arranged in series.

9. The process according to claim 1, further comprising passing acid gases and vapor from said flash tank stripper through a condenser and removing lean amine and condensate for recirculation.

10. The process according to claim 1, further comprising using an amine solution including one or more of monoethanol amine (MEA), diethanol amine (DEA), or methyl diethanol amine (MDEA).

11. The process according to claim 1, wherein the process is performed to remove $CO_2$ and/or $H_2S$ from the gaseous stream.

12. The process according to claim 1, wherein the process is performed at a predetermined pressure dependent on a supply pressure of the gaseous stream.

13. The process according to claim 12, wherein the process is performed at a gaseous stream supply pressure of 60-70 bar.

* * * * *